(12) United States Patent
Zhang et al.

(10) Patent No.: US 12,315,078 B2
(45) Date of Patent: May 27, 2025

(54) SELF-DRIVING SIMULATION RENDERING METHOD AND APPARATUS, DEVICE, AND READABLE MEDIUM

(71) Applicant: INSPUR SUZHOU INTELLIGENT TECHNOLOGY CO., LTD., Jiangsu (CN)

(72) Inventors: Yu Zhang, Jiangsu (CN); Zhan Gong, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 201 days.

(21) Appl. No.: 18/005,940

(22) PCT Filed: Feb. 19, 2021

(86) PCT No.: PCT/CN2021/076877
§ 371 (c)(1),
(2) Date: Jan. 18, 2023

(87) PCT Pub. No.: WO2022/016859
PCT Pub. Date: Jan. 27, 2022

(65) Prior Publication Data
US 2023/0351685 A1 Nov. 2, 2023

(30) Foreign Application Priority Data
Jul. 23, 2020 (CN) .......................... 202010717480.9

(51) Int. Cl.
G06T 17/00 (2006.01)
G06T 15/00 (2011.01)

(52) U.S. Cl.
CPC .......... *G06T 17/005* (2013.01); *G06T 15/005* (2013.01); *G06T 2210/22* (2013.01)

(58) Field of Classification Search
CPC . G06T 17/005; G06T 15/005; G06T 2210/22; B60W 60/0011;
(Continued)

(56) References Cited

U.S. PATENT DOCUMENTS

| 7,015,913 B1 | 3/2006 | Lindholm et al. |
| 2016/0162171 A1 | 6/2016 | Yi |

FOREIGN PATENT DOCUMENTS

| CN | 103914868 A | 7/2014 |
| CN | 104102488 A | * 10/2014 |

(Continued)

OTHER PUBLICATIONS

Dosovitskiy, Carla: An Open Urban Driving Simulator, 2017, 1st Conference on Robot Learning (CoRL 2017), Mountain View, United States (Year: 2017).*

(Continued)

*Primary Examiner* — Kee M Tung
*Assistant Examiner* — Biao Chen
(74) *Attorney, Agent, or Firm* — Dennemeyer & Associates LLC (57) ABSTRACT

A self-driving simulation rendering method and apparatus, a computer device, and a readable storage medium wherein the method includes: loading a scene file, performing scene modeling based on a tree model, and establishing a static spatial index (S1); setting a dynamic traffic flow to generate a dynamic scene, and setting a position and direction of a sensor (S2); and creating a first thread and a second thread, scheduling the first thread to crop each frame of the dynamic scene based on the tree model, and scheduling the second thread to render, based on the position and direction of the sensor, each frame cropped by the first thread and output the rendered frame (S3). Modeling and efficient cropping of an effective area are carried out by means of a tree model, (Continued)

which ensures that only valid information is rendered, thereby reducing resource waste.

16 Claims, 2 Drawing Sheets

(58) Field of Classification Search
CPC ... B60W 60/00274; B60W 2554/4041; B60W 2554/4044; B60W 2554/80
See application file for complete search history.

(56) References Cited

FOREIGN PATENT DOCUMENTS

| CN | 108701164 A | | 10/2018 | | |
|---|---|---|---|---|---|
| CN | 109101690 A | | 12/2018 | | |
| CN | 110738721 A | * | 1/2020 | ........... | G06T 15/005 |
| CN | 110779730 A | | 2/2020 | | |
| CN | 111862314 A | | 10/2020 | | |
| WO | 2017092335 A1 | | 6/2017 | | |

OTHER PUBLICATIONS

Caesar et al., nuScenes: A multimodal dataset for autonomous driving, Proceedings of the IEEE/CVF Conference on Computer Vision and Pattern Recognition (CVPR), Jun. 13, 2000 to Jun. 15, 2020, pp. 11621-11631, CVPR 2020 open access (Year: 2020).*
Zhang, a machine translated English version of a foreign patent application (CN 104102488 A). (Year: 2014).*
Han et al., a machine translated English version of a foreign patent application (CN 110738721 A). (Year: 2020).*
International Search report for PCT/CN2021/076877 mailed on Mar. 26, 2021.
Chinese Search report for application No. 202010717480.9.

* cited by examiner

SELF-DRIVING SIMULATION RENDERING METHOD AND APPARATUS, DEVICE, AND READABLE MEDIUM

CROSS-REFERENCE TO RELATED APPLICATIONS

This is a 35 U.S.C. 371 National Stage Patent Application of International Application No. PCT/CN2021/076877, filed Feb. 19, 2021, which claims priority to Chinese application 202010717480.9, filed Jul. 23, 2020, each of which is hereby incorporated by reference in its entirety.

TECHNICAL FIELD

The present disclosure relates to the technical field of self-driving, and in particular, to a self-driving simulation rendering method and apparatus, a device, and a readable medium.

BACKGROUND

A self-driving algorithm model is the "brain" of the whole self-driving vehicle, and is very important for the self-driving vehicle. The self-driving algorithm model controls how the vehicle perceives an environment, receives data in real time, and processes data. The data is used by a system to make decisions, provide a real-time command feedback to a chassis execution system, and minimize risks.

For self-driving, a simulation test is a basic technology for technology verification, support system training, test, and verification. Self-driving simulation software has functions of road generation, scene definition, traffic flow simulation, control simulation, sensor simulation, etc. In a simulation process, static scenes (roads, traffic signs, etc.) are created first, then dynamic traffic flow is created, simulation pictures or videos are obtained through the sensor simulation, and then simulation data are transmitted to a tested device.

The self-driving simulation software in a related art mainly conducts the following operations when performing the sensor simulation: generating a simulation environment model according to a scene file, generating a dynamic traffic flow, specifying a sensor configuration, and rendering a scene to obtain a picture.

When performing scene rendering, a logical relationship among various objects in the current simulation world is obtained, information of objects within a certain distance around the present vehicle is acquired according to a position of the present vehicle, these objects are rendered, an area corresponding to a sensor in the present vehicle is acquired according to information such as the position of the sensor, and a rendered picture of the area is captured.

When rendering a simulation scene according to the related art, information of all objects within a certain distance around the present vehicle will be acquired, including information required by the sensor. However, part of the acquired information is not needed, which results in a waste of resources. Moreover, when performing the simulation scene rendering for multi-sensor simulation, rendering needs to be performed for multiple viewports simultaneously, the efficiency is low, and resources of a Graphics Processing Unit (GPU) are not fully used.

SUMMARY

In view of the above, embodiments of the present disclosure provide a self-driving simulation rendering method and apparatus, a device, and a readable medium. In the technical solution of the embodiments of the present disclosure, modeling and efficient cropping of an effective area are carried out by means of a tree model, which ensures that only valid information is rendered, thereby reducing resource waste. Moreover, in the technical solution of the embodiments of the present disclosure, scene simulation rendering is divided into two stages, and a multi-thread parallel mode is designed according to resource consumption conditions at each stage, in this way, the simulation rendering speed may be accelerated, the simulation may be implemented in real-time, and the usage efficiency of the resources may be effectively increased.

Based on the abovementioned objective, a first aspect of the embodiments of the present disclosure provides a self-driving simulation rendering method, including the following operations: a scene file is loaded, scene modeling is performed based on a tree model, and a static spatial index is established; a dynamic traffic flow is configured to generate a dynamic scene, and a position and direction of a sensor are set; and a first thread and a second thread are created, the first thread is scheduled to crop each frame of the dynamic scene based on the tree model, and the second thread is scheduled to render, based on the position and direction of the sensor, each frame cropped by the first thread and output the rendered frame.

In some implementation modes, the operation that the first thread and the second thread are created includes: corresponding viewports are created according to the number of sensors, and a first thread and a second thread are respectively created for each viewport; and the first threads of all viewports are scheduled to start cropping the first frame of the dynamic scene at the same time.

In some implementation modes, the operation that the first thread is scheduled to crop each frame of the dynamic scene based on the tree model includes: the first thread crops a current frame of the dynamic scene based on the tree model; and the next frame is cropped in a case that the cropping of the current frame is completed.

In some implementation modes, the operation that the second thread is scheduled to render, based on the position and direction of the sensor, each frame cropped by the first thread and output the rendered frame includes: the second thread renders and outputs a Three-dimensional (3D) scene obtained by cropping a current frame by the first thread into a Two-dimensional (2D) picture based on the position and direction of the sensor; whether the first thread completes the cropping of a next frame is determined in a case that the rendering of the current frame is completed; and the second frame is scheduled to render and output the next frame in a case that the first thread completes the cropping of the next frame.

In some implementation modes, the operation that the first thread is scheduled to crop each frame of the dynamic scene based on the tree model includes: whether an area, corresponding to the tree model, of the dynamic scene is a rendering area of interest is determined; a relationship between the rendering area of interest and a cropping area is further determined in a case that the area is the rendering area of interest; and a 3D scene is constructed, and a cropping result is output in a case that the rendering area of interest is in the cropping area.

In some implementation modes, the method further includes the following operations: the tree model is cropped and filtered in a case that the rendering area of interest intersects the cropping area; and a 3D scene model is reconstructed, and a cropping result is output.

In some implementation modes, the operation that the static spatial index is established includes: an east primary node, a west primary node, a south primary node, and a north primary node are established according to directions of the scene; and one or more secondary nodes are established according to objects in the scene.

Another aspect of the embodiments of the present disclosure further provides a self-driving simulation rendering apparatus, which includes: a modeling module, configured to load a scene file, perform scene modeling based on a tree model, and establish a static spatial index; a collection module, configured to set a dynamic traffic flow to generate a dynamic scene, and set a position and direction of a sensor; and a cropping and rendering module, configured to create a first thread and a second thread, schedule the first thread to crop each frame of the dynamic scene based on the tree model, and schedule the second thread to render, based on the position and direction of the sensor, each frame cropped by the first thread and output the rendered frame.

In some implementation modes, the cropping and rendering module is further configured to: create corresponding viewports according to the number of sensors, and respectively create a first thread and a second thread for each viewport; and schedule the first threads of each viewport to start cropping the first frame of the dynamic scene at the same time.

In some implementation modes, the cropping and rendering module is further configured to: schedule the first thread to crop a current frame of the dynamic scene based on the tree model; and crop a next frame in a case that the cropping of the current frame is completed.

In some implementation modes, the cropping and rendering module is further configured to: schedule the second thread to render, based on the position and direction of the sensor, a 3D scene obtained by cropping a current frame by the first thread into a 2D picture and output the rendered picture; determine, in a case that the rendering of the current frame is completed, whether the first thread completes the cropping of a next frame; and schedule the second frame to render and output the next frame in a case that the first thread completes the cropping of the next frame.

In some implementation modes, the cropping and rendering module is further configured to: determine whether an area, corresponding to the tree model, of the dynamic scene is a rendering area of interest; further determine a relationship between the rendering area of interest and a cropping area in a case that the area is the rendering area of interest; construct a 3D scene and output a cropping result in a case that the rendering area of interest is in the cropping area; and crop and filter the tree model in a case that the rendering area of interest intersects the cropping area; and reconstruct a 3D scene model, and output a cropping result.

In some implementation modes, the modeling module is further configured to: establish an east primary node, a west primary node, a south primary node, and a north primary node according to directions of the scene; and establish one or more secondary nodes according to objects in the scene.

Yet another aspect of the embodiments of the present disclosure further provides a computer device, including at least one processor, and a memory. The memory stores a computer instruction capable of running on the at least one processor; and the instruction implements operations of the abovementioned method when being executed by the at least one processor.

Still another aspect of the embodiments of the present disclosure further provides a computer-readable storage medium. The computer-readable storage medium stores a computer program that implements operations of the abovementioned method when being executed by at least one processor.

The present disclosure has the following beneficial effects that: modeling and efficient cropping of an effective area are carried out by means of a tree model, which ensures that only valid information is rendered, thereby reducing resource waste. Moreover, scene simulation rendering is divided into two stages, and a multi-thread parallel mode is designed according to resource consumption conditions at each stage, in this way, the simulation rendering speed may be accelerated so that the simulation may be implemented in real-time, and the usage efficiency of the resources may be effectively increased.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings in the following description are only some embodiments of the present disclosure, and other embodiments may be obtained by those skilled in the art according to these drawings without any creative work.

DETAILED DESCRIPTION OF THE EMBODIMENTS

In order to make the purposes, technical solutions, and advantages of the present disclosure clearer, the present disclosure will be further described in detail below with reference to the drawings and embodiments.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Figure 1:
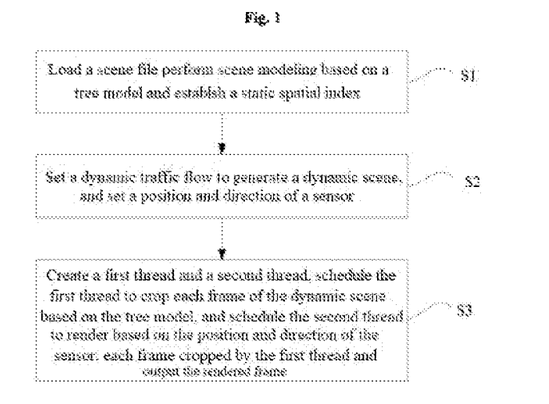
FIG. 1 illustrates a schematic diagram of a self-driving simulation rendering method provided in the embodiments of the present disclosure.

Based on the abovementioned objective, a first aspect of the embodiments of the present disclosure provides a self-driving simulation rendering method. FIG. 1 illustrates a schematic diagram of a self-driving simulation rendering method provided in the embodiments of the present disclosure. As shown in FIG. 1, the self-driving simulation rendering method includes the following operations.

At S1, a scene file is loaded, scene modeling is performed based on a tree model, and a static spatial index is established.

At S2, a dynamic traffic flow is set to generate a dynamic scene, and a position and direction of a sensor are set.

At S3, a first thread and a second thread are created, the first thread is scheduled to crop each frame of the dynamic scene based on the tree model, and the second thread is scheduled to render, based on the position and direction of the sensor, each frame cropped by the first thread and output the rendered frame.

In the embodiments, simulation rendering is divided into two stages, and a multi-thread parallel mode is designed according to resource consumption conditions of the two stages. Different resource are allocated for a single viewport or multiple viewports, in this way, the resources may be allocated more reasonably on the premise of ensuring the simulation quality, the maximum frame rate of simulation may be effectively improved, and the resources may be utilized maximally. The first stage corresponding to the first thread is mainly a logical operation, which consumes Central Processing Unit (CPU) resources. The second stage corresponding to the second thread requires not only the logical operation, but also picture rendering, which consumes CPU and GPU resources. Therefore, processing time of the first stage is much less than that of the second stage. The two threads operate on different CPU cores. Since the first stage consumes less time, operations like updating scene and confirming rendering parts in the next frame may be processed in advance during waiting for the second stage to perform rendering. Thus, rendering time of each frame may be shortened, and the usage efficiency of the resources may be improved.

In some embodiments of the present disclosure, the operation that the first thread and the second thread are created includes: corresponding viewports are created according to the number of sensors, and a first thread and a second thread are respectively created for each viewport; and the first threads of each viewport are scheduled to start cropping the first frame of the dynamic scene at the same time.

In the embodiments, multiple-viewport simulation is generally used for testing a case that multiple sensors are installed in one vehicle. One viewport represents one sensor. The multiple-viewport simulation is more commonly used in a simulation test. A multi-viewport single-thread mode is the same as a single-viewport mode, which processes the first stage or the second stage of each viewport in sequence.

In the embodiments, taking the following configuration as an example: a server is an Inspur NF5280M5 server; the CPU is Intel® Xeon® Gold 6130 CPU@2.10 GHz; a video card is a 4*1080TI, 11G video memory/card; and a software environment is an Ubuntu 18.04.4 LTS operating system. Based on the existing self-driving simulation software, an '8'-shaped cyclic driving scene is rendered by the method of the embodiments of the present disclosure. The test adopts a dual-viewport configuration, and a simulation frame rate and resource consumption of the single-thread mode and the multi-thread mode are respectively tested.

Scene modeling is performed by loading a scene file, and a static scene is established. A dynamic traffic flow is set to generate a dynamic scene. A position, direction, etc. of a sensor are configured. Simulation picture rendering of the sensor is performed. In the single-thread mode, it is tested that the frame rate is 40-50 HZ, and the GPU utilization rate is 83%. In the multi-thread mode, it is tested that the frame rate is 50-60 HZ, and the GPU utilization rate is 97%.

In some embodiments of the present disclosure, the operation that the first thread is scheduled to crop each frame of the dynamic scene based on the tree model includes: the first thread crops a current frame of the dynamic scene based on the tree model; and the next frame is cropped in a case that the cropping of the current frame is completed.

In some embodiments of the present disclosure, the operation that the second thread renders and outputs each frame cropped by the first thread based on the position and direction of the sensor includes: the second thread renders, based on the position and direction of the sensor, a 3D scene obtained by cropping a current frame by the first thread into a 2D picture and output the rendered picture; whether the first thread completes the cropping of a next frame is determined in a case that the rendering of the current frame is completed; and the second frame is scheduled to render and output the next frame in a case that the first thread completes the cropping of the next frame.

In the embodiments, the second thread is scheduled to render a determined 3D scene into a 2D picture for outputting by using an Open Graphics Library (OpenGL) according to the position and direction of the sensor.

In some embodiments of the present disclosure, the operation that the first thread is scheduled to crop each frame of the dynamic scene based on the tree model includes: whether an area, corresponding to the tree model, of the dynamic scene is a rendering area of interest is determined; a relationship between the rendering area of interest and a cropping area is further determined in a case that the area is the rendering area of interest; and a 3D scene is constructed and a cropping result is output in a case that the rendering area of interest is in the cropping area.

In some embodiments of the present disclosure, the method further includes: the tree model is cropped and filtered in a case that the rendering area of interest intersects the cropping area; and a 3D scene model is reconstructed, and a cropping result is output.

In the embodiments, the scenes and vehicles, etc. needing to be included in a part to be rendered are quickly determined according to a binary tree model. An area range corresponding to the sensor, i.e., corresponding to a certain part in the tree model, is acquired according to the position and direction of the sensor of the present vehicle. Objects needed to be rendered are acquired according to the area range, and then corresponded to object information included in the binary tree model. The scene is cropped based on the tree model, and data layering of the tree model is beneficial to extracting a data layer of interest. Only a certain area needs to be processed based on the tree model, and the data outside the cropping area is directly excluded. The tree model is filtered and cropped respectively stage by stage, so as to obtain a cropping result. Then, the cropping result is reconstructed according to the tree model, so as to obtain a scene in the cropping area. Screening may be performed first according to the configuration of the sensor when simulation object information is acquired, and the object information that does not need to be rendered is removed, thereby avoiding the waste of resource.

In some embodiments of the present disclosure, the operation that a static spatial index is established includes: an east primary node, a west primary node, a south primary node, and a north primary node are established according to directions of the scene; and one or more secondary nodes are established according to objects in the scene.

In the embodiments, according to the information of each object in the specific simulation of the tree model, information about the scene object may be efficiently queried and deleted. Scene content is divided into multiple subordinate nodes according to information such as a direction. Then, an efficient spatial index is constructed by taking the tree model as a basis. The data layering of the tree model is beneficial to data extraction, so as to facilitate dynamic cropping. Objects needed to be rendered are quickly cropped according to the sensor information and the tree model, so that unnecessary resource consumption is somehow reduced, and meanwhile, the rendering efficiency may also be improved.

It is to be particularly noted that respective operations in respective embodiments of the abovementioned self-driving simulation rendering method may be interchanged, replaced, added, or deleted, so that these rational transformations of permutation and combination for the self-driving simulation rendering method should also fall within the scope of protection of the present disclosure, and the scope of protection of the present disclosure should not be limited to the embodiments.

Figure 2:
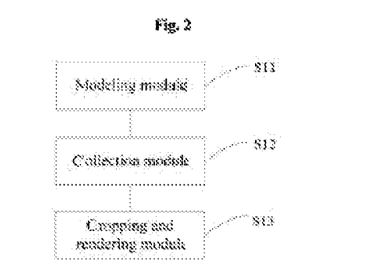
FIG. 2 illustrates a schematic diagram of a self-driving simulation rendering apparatus provided in the embodiments of the present disclosure.

Based on the abovementioned objective, a second aspect of the embodiments of the present disclosure provides a self-driving simulation rendering apparatus. FIG. 2 illustrates a schematic diagram of a self-driving simulation rendering apparatus provided in the embodiments of the present disclosure. As shown in FIG. 2, the embodiment of the present disclosure includes the following modules: a modeling module S11, configured to load a scene file, perform scene modeling based on a tree model, and establish a static spatial index; a collection module S12, configured to set a dynamic traffic flow to generate a dynamic scene, and set a position and direction of a sensor; and a cropping and rendering module S13, configured to create a first thread and a second thread, schedule the first thread to crop each frame of the dynamic scene based on the tree model, and schedule the second thread to render, based on the position and direction of the sensor, each frame cropped by the first thread and output the rendered frame.

In some embodiments of the present disclosure, the cropping and rendering module S13 is further configured to: create corresponding viewports according to the number of sensors, and respectively create a first thread and a second thread for each viewport; and schedule the first threads of each viewport to start cropping the first frame of dynamic scene at the same time.

In some embodiments of the present disclosure, the cropping and rendering module S13 is further configured to: schedule the first thread to crop a current frame of the dynamic scene based on the tree model; and crop a next frame in a case that the cropping of the current frame is completed.

In some embodiments of the present disclosure, the cropping and rendering module S13 is further configured to: schedule the second thread to render, based on the position and direction of the sensor, a 3D scene obtained by cropping the current frame by the first thread into a 2D picture and output the rendered picture; determine, in a case that the rendering of the current frame is completed, whether the first thread completes the cropping of a next frame; and schedule the second frame to render and output the next frame in a case that the first thread completes the cropping of the next frame.

In some embodiments of the present disclosure, the cropping and rendering module S13 is further configured to: determine whether an area, corresponding to the tree model, of the dynamic scene is a rendering area of interest; further determine a relationship between the rendering area of interest and a cropping area in a case that the area is the rendering area of interest; and construct a 3D scene and output a cropping result in a case that the rendering area of interest is in the cropping area; and crop and filter the tree model in a case that the rendering area of interest intersects the cropping area; and reconstruct the 3D scene model, and output a cropping result.

In some embodiments of the present disclosure, the modeling module S11 is further configured to: establish an east primary node, a west primary node, a south primary node, and a north primary node according to directions of the scene; and establish one or more secondary nodes according to objects in the scene.

Figure 3:
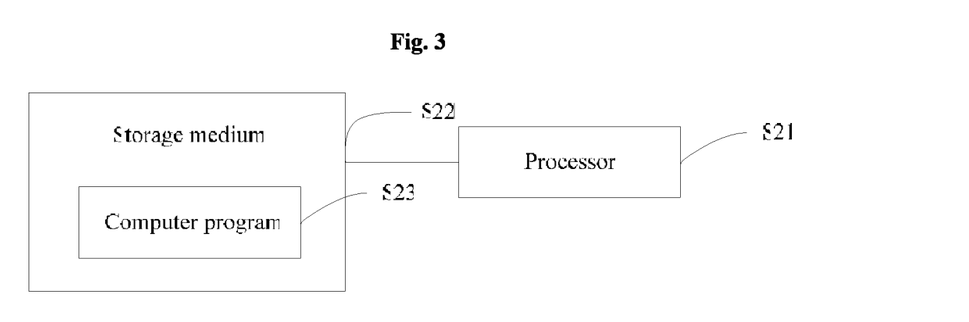
FIG. 3 illustrates a schematic diagram of a computer device provided in the embodiments of the present disclosure.

Based on the abovementioned objective, a third aspect of the embodiments of the present disclosure provides a computer device. FIG. 3 illustrates a schematic diagram of a computer device provided in the embodiments of the present disclosure. As shown in FIG. 3, the embodiment of the present disclosure includes the following apparatuses: at least one processor S21, and a memory S22. The memory S22 stores a computer instruction S23 capable of running on the at least one processor; and the instruction implements operations of the above method when being executed by the at least one processor.

Figure 4:
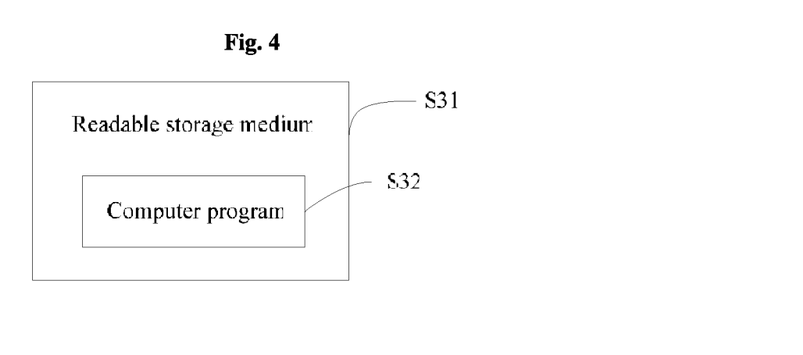
FIG. 4 illustrates a schematic diagram of a computer-readable storage medium provided in the embodiments of the present disclosure.

The present disclosure further provides a computer-readable storage medium. FIG. 4 illustrates a schematic diagram of a computer-readable storage medium provided in the embodiments of the present disclosure. As shown in FIG. 4, the computer-readable storage medium S31 stores a computer program S32 that implements the abovementioned method when being executed by at least one processor.

It is finally to be noted that, those of ordinary skill in the art may understand that all or part of the processes in the abovementioned embodiments of the method may be implemented by a computer program to instruct related hardware, and the program of the self-driving simulation rendering method may be stored in a computer-readable storage medium. When the program is executed, the flows of the embodiments as described in the above methods may be included. The storage medium of the program may be a magnetic disk, an optical disk, a Read Only Memory (ROM) or a Random Access Memory (RAM), and the like. The abovementioned embodiment of the computer program may achieve the same or similar effects as any foregoing method embodiment corresponding thereto.

In addition, the methods disclosed according to the embodiments of the present disclosure may also be implemented as a computer program executed by at least one processor, and the computer program may be stored in a computer-readable storage medium. When the computer program is executed by the processor, the abovementioned functions defined in the methods disclosed in the embodiments of the present disclosure are executed.

In addition, the abovementioned method operations and system units may also be implemented by a controller and a computer-readable storage medium for storing a computer program that enables the controller to implement the functions of the abovementioned operations or units.

Those skilled in the art will also appreciate that, various exemplary logical blocks, modules, circuits, and algorithm operations described in combination with the present disclosure may be implemented as electronic hardware, computer software, or a combination of both. To clearly describe such interchangeability of hardware and software, various illustrative components, blocks, modules, circuits, and operations have been described generally in terms of their functionality. Whether such functionality is implemented as software or hardware depends on the specific application and design constraints imposed on the entire system. Those skilled in the art may implement the functions in various ways for each specific application, but such implementation decisions should not be interpreted as causing a departure from the scope of the disclosed embodiments of the present disclosure.

In one or more exemplary designs, the functions may be implemented in hardware, software, firmware, or any combination thereof. If the functions are implemented in software, the functions may be stored on the computer-readable medium as one or more instructions or codes or be transferred by means of the computer-readable medium. The computer-readable medium includes a computer storage medium and a communication medium. The communication medium includes any media that is beneficial to transmitting a computer program from one place to another. The storage medium may be any available media that can be accessed by a general or special computer. By way of example but not limitation, the computer-readable medium may include an RAM, an ROM, an Electrically Erasable Programmable Read Only Memory (EEPROM), Compact Disc Read Only Memory (CD-ROM) or other optical disk storage devices, magnetic disk storage devices or other magnetic storage devices, or may be any other medium that may be used to carry or store the required program code in the form of instructions or data structures, and that can be accessed by a general or special computer or a general or special processor. In addition, any connection may properly be called a computer-readable medium. For example, if a coaxial cable, a fiber optic cable, a twisted pair, a Digital Subscriber Line (DSL), or wireless technologies such as infrared, radio and microwave are used to send software from a web site, a server, or other remote sources, the above coaxial cable, the fiber optic cable, the twisted pair, the DSL or the wireless technologies such as infrared, radio and microwave are all included in the definition of the medium. As used herein, the magnetic disk and the optical disk include a Compact Disk (CD), a laser disk, an optical disk, a Digital Versatile Disk (DVD), a floppy disk and a blu-ray disk, and the magnetic disk usually reproduces data magnetically, while the optical disk reproduces data optically with lasers. Combinations of the above content should also fall within the scope of the computer-readable medium.

The above are exemplary embodiments of the present disclosure, but it should be noted that, various changes and modifications may be made without departing from the scope disclosed in the embodiments of the present disclosure as defined in the claims. The functions, operations and/or actions of the method claims in accordance with the embodiments described herein need not to be performed in any particular order. In addition, although an element disclosed in the embodiments of the present disclosure may be described or claimed individually, unless explicitly limited to a singular form, the element may also be construed as a plural form.

It is to be understood that, as used herein, the singular form "a" is intended to include the plural form as well, unless an exception is clearly supported in the context. It is also to be understood that, "and/or" as used herein is meant to include any and all possible combinations of one or more of the listed items associated therewith.

Serial numbers of the foregoing embodiments of the present disclosure are merely for description, and do not represent the superiority or inferiority of the embodiments.

Those of ordinary skill in the art may understand that, all or part of the operations in the above embodiments may be completed by means of hardware, or may be completed by instructing the related hardware through a program. The program may be stored in a computer-readable storage medium, and the foregoing storage medium may be an ROM, a magnetic disk, or an optical disk.

Those of ordinary skill in the art should understand that the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments may also be combined with each other. In addition, there may be many other changes in different aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A self-driving simulation rendering method, comprising:
    loading a scene file, performing scene modeling based on a tree model, and establishing a static spatial index;
    setting a dynamic traffic flow to generate a dynamic scene, and setting a position and direction of a sensor; and
    creating a first thread and a second thread, scheduling the first thread to crop each frame of the dynamic scene based on the tree model, and scheduling the second thread to render, based on the position and direction of the sensor, each frame cropped by the first thread and output the rendered frame;
    wherein scheduling the first thread to crop each frame of the dynamic scene based on the tree model comprises:
    determining whether an area, corresponding to the tree model, of the dynamic scene is a rendering area of interest,
    further determining a relationship between the rendering area of interest and a cropping area in a case that the area, corresponding to the tree model, of the dynamic scene is the rendering area of interest; and
    constructing a Three-dimensional (3D) scene and outputting a cropping result in a case that the rendering area of interest is in the cropping area;
    wherein the self-driving simulation rendering method further comprising:
    cropping and filtering the tree model in a case that the rendering area of interest intersects the cropping area; and
    reconstructing a 3D scene model and outputting a cropping result.

2. The self-driving simulation rendering method according to claim 1, wherein in a case where there are multiple sensors, creating the first thread and the second thread comprises:
    creating corresponding viewports according to the number of the multiple sensors, and respectively creating a first thread and a second thread for each viewport; and
    scheduling the first threads of all viewports to start cropping a first frame of the dynamic scene at the same time.

3. The self-driving simulation rendering method according to claim 1, wherein scheduling the first thread to crop each frame of the dynamic scene based on the tree model comprises:
    cropping, by the first thread, a current frame of the dynamic scene based on the tree model; and
    cropping a next frame in a case that the cropping of the current frame is completed.

4. The self-driving simulation rendering method according to claim 1, wherein scheduling the second thread to render, based on the position and direction of the sensor, each frame cropped by the first thread and output the rendered frame comprises:

rendering, by the second thread, a Three-dimensional (3D) scene obtained by cropping a current frame by the first thread into a Two-dimensional (2D) picture based on the position and direction of the sensor, and outputting, by the second thread, the 2D picture;

determining, in a case that the rendering of the current frame is completed, whether the first thread completes the cropping of a next frame; and scheduling the second thread to render and output the next frame in a case that the first thread completes the cropping of the next frame.

5. The self-driving simulation rendering method according to claim 4, wherein rendering, by the second thread, the 3D scene obtained by cropping the current frame by the first thread into the 2D picture according to the position and direction of the sensor comprises:

render, by the second thread, the 3D scene into the 2D picture for outputting by using an Open Graphics Library (OpenGL) according to the position and direction of the sensor.

6. The self-driving simulation rendering method according to claim 1, wherein establishing the static spatial index comprises:

establishing an east primary node, a west primary node, a south primary node, and a north primary node according to directions of the scene; and establishing one or more secondary nodes according to objects in the scene.

7. The self-driving simulation method according to claim 1, wherein the first thread and the second thread operate on different Central Processing Unit (CPU) cores.

8. The self-driving simulation rendering method according to claim 1, wherein cropping and filtering the tree model comprises:

determining, according to a binary tree model, scenes and vehicles needing to be included in a part to be rendered;

acquiring an area range corresponding to the sensor according to the area range, and then corresponding the objects needed to be rendered to object information included in the binary tree model.

9. The self-driving simulation rendering method according to claim 8, further comprising:

cropping the scene based on the tree model, wherein only a cropping area needs to be processed based on the tree model, and data outside the cropping area is directly excluded.

10. The self-driving simulation rendering method according to claim 9, further comprising:

respectively filtering and cropping the tree model stage by stage, so as to obtain a cropping result;

reconstructing the cropping result according to the tree model, so as to obtain a scene in the cropping area.

11. The self-driving simulation rendering method according to claim 1, wherein establishing a static spatial index comprises:

establishing the static spatial index by taking the tree model as a basis.

12. A computer device, comprising:
at least one processor; and
a memory, wherein the memory stores a computer instruction capable of running on the at least one processor; and the instruction, when being executed by the at least one processor, causes the at least one processor to:

load a scene file, perform scene modeling based on a tree model, and establish a static spatial index;

set a dynamic traffic flow to generate a dynamic scene, and set a position and direction of a sensor; and create a first thread and a second thread, schedule the first thread to crop each frame of the dynamic scene based on the tree model, and schedule the second thread to render, based on the position and direction of the sensor, each frame cropped by the first thread and output the rendered frame;

wherein the instruction, when being executed by the at least one processor, causes the at least one processor to schedule the first thread to crop each frame of the dynamic scene based on the tree model, by following steps:

determining whether an area, corresponding to the tree model, of the dynamic scene is a rendering area of interest;

further determining a relationship between the rendering area of interest and a cropping area in a case that the area, corresponding to the tree model, of the dynamic scene is the rendering area of interest; and constructing a Three-dimensional (3D) scene and outputting a cropping result in a case that the rendering area of interest is in the cropping area;

wherein the instruction, when being executed by the at least one processor, further causes the at least one processor to:

crop and filter the tree model in a case that the rendering area of interest intersects the cropping area; and reconstruct a 3D scene model and output a cropping result.

13. The computer device according to claim 12, wherein the instruction, when being executed by the at least one process, causes the at least one processor to:

create corresponding viewports according to the number of the multiple sensors, and respectively creating a first thread and a second thread for each viewport; and schedule the first threads of all viewports to start cropping the first frame of the dynamic scene at the same time.

14. The computer device according to claim 12, wherein the instruction, when being executed by the at least one processor, causes the at least one processor to:

crop, by the first thread, a current frame of the dynamic scene based on the tree model; and crop a next frame in a case that the cropping of the current frame is completed.

15. The computer device according to claim 12, wherein the instruction, when being executed by the at least one processor, causes the at least one processor to:

render, by the second thread, a Three-dimensional (3D) scene obtained by cropping a current frame by the first thread into a Two-dimensional (2D) picture based on the position and direction of the sensor, and outputting by the second thread, the 2D picture;

determine, in a case that the rendering of the current frame is completed, whether the first thread completes the cropping of a next frame; and schedule the second thread to render and output the next frame in a case that the first thread completes the cropping of the next frame.

16. A non-transitory computer-readable storage medium, storing a computer program, wherein when the computer program is executed by at least one processor, following operations are implemented:

loading a scene file, performing scene modeling based on a tree model, and establishing a static spatial index;

a position and direction of a sensor: and setting a dynamic traffic flow to generate a dynamic scene, and setting creating a first thread and a second thread, scheduling the first thread to crop each frame of the dynamic scene based on the tree model, and scheduling the second thread to render, based on the position and direction of the sensor, each frame cropped by the first thread and output the rendered frame;

wherein when the computer program is executed by at least one processor, following operations are implemented to schedule the first thread to crop each frame of the dynamic scene based on the tree model;

determining whether an area, corresponding to the tree model, of the dynamic scene is a rendering area of interest;

further determining a relationship between the rendering area of interest and a cropping area in a case that the area, corresponding to the tree model, of the dynamic scene is the rendering area of interest; and constructing a Three-dimensional (3D) scene and outputting a cropping result in a case that the rendering area of interest is in the cropping area;

wherein when the computer program is executed by at least one processor, following operations are further implemented;

cropping and filtering the tree model in a case that the rendering area of interest intersects the cropping area, and reconstructing a 3D scene model and outputting a cropping result.

* * * * *